No. 708,225. Patented Sept. 2, 1902.
F. E. HALL.
ELASTIC TIRE AND PROCESS OF MANUFACTURING SAME.
(Application filed Feb. 23, 1900.)
(No Model.)
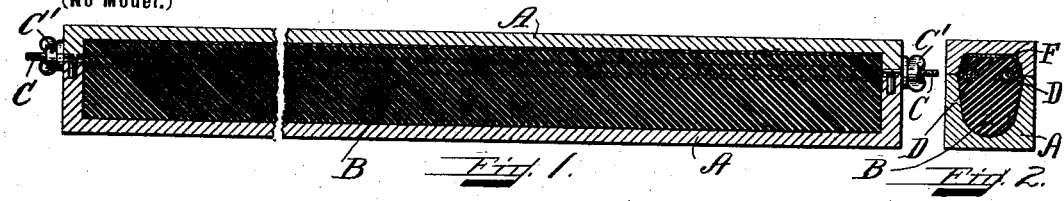
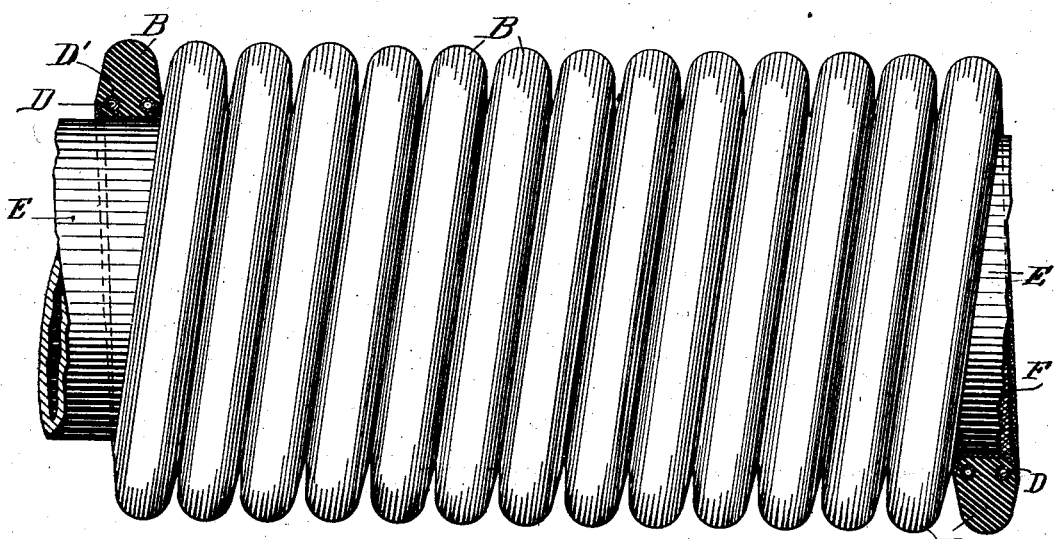
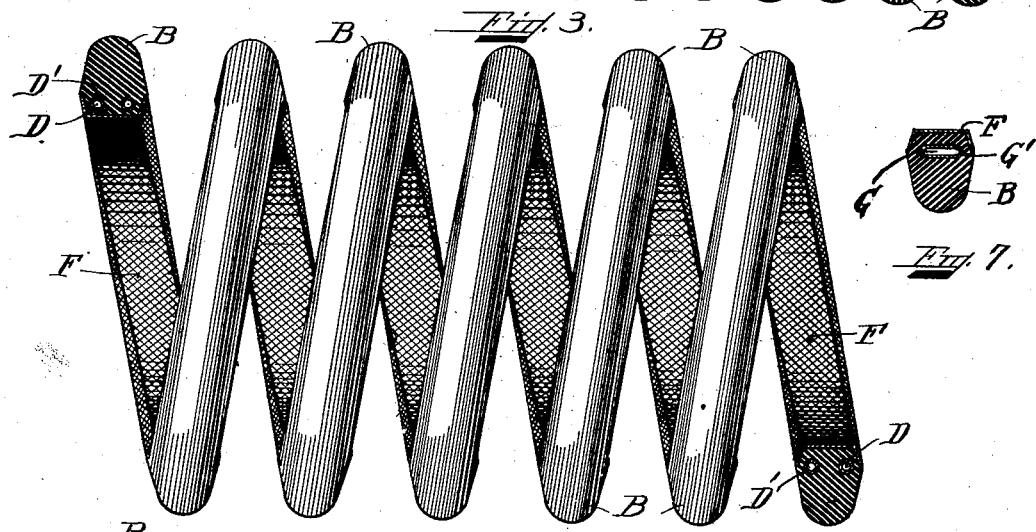
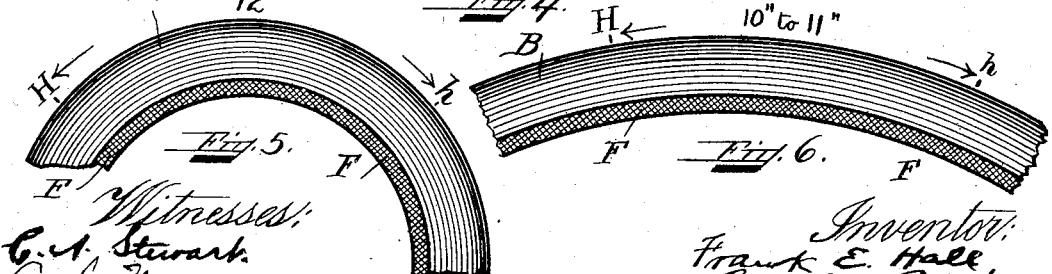

the passages in place in the mold used in the first step of vulcanization.

UNITED STATES PATENT OFFICE.

FRANK E. HALL, OF QUINCY, MASSACHUSETTS.

ELASTIC TIRE AND PROCESS OF MANUFACTURING SAME.

SPECIFICATION forming part of Letters Patent No. 708,225, dated September 2, 1902.

Application filed February 23, 1900. Serial No. 6,137. (No model.)

*To all whom it may concern:*

Be it known that I, FRANK ELMER HALL, of Quincy, in the county of Norfolk and State of Massachusetts, have invented certain new and useful Improvements in Elastic Tires and a new and useful Process of Manufacturing the Same, of which the following is a specification.

My invention relates to a new and useful process of manufacturing elastic tires for vehicle-wheels and to the tire produced by said process. The tire is quickly and easily manufactured and is provided with one or more passages longitudinal through the tire to receive the retaining wires or bands for holding the tire on the wheel.

My invention consists of a process and the product produced by such process, as hereinafter described, and particularly pointed out in the claims.

In the accompanying drawings, Figure 1 is a longitudinal central section through a mold, with the rubber and wires for making the passages in place in the mold used in the first step of vulcanization. Fig. 2 is a cross-section view through the mold with the rubber in place and the wires withdrawn, showing the passages. Fig. 3 shows the tire after being semivulcanized in the mold wound on an arbor to give it the form of a spiral spring. Fig. 4 shows the tire after being fully vulcanized and taken from the arbor in the form of a spiral spring, with the diameter much smaller than the diameter of the wheel to which it is to be applied. Fig. 5 shows a section of the tire after complete vulcanization forming a circle much smaller in diameter than the diameter of the wheel to which it is to be applied. Fig. 6 shows the section of tire opened out of a circle of larger diameter, causing a compression in the periphery of the tire and a slight elongation of the base. Fig. 7 is a detail view of a cross-section of a tire with one elongated passage instead of two passages shown in the other views.

Like letters of reference refer to like parts throughout the several views.

A represents the iron mold in which the rubber tire B is semivulcanized to give it its cross-section shape, as shown in Fig. 2, and C represents one of the metal rods held in place by thumb-screws C', and said rods extend through the rubber tire B and are afterward withdrawn to form the passages D D, Fig. 2. The tire B after being taken from the mold A and after the rods C have been withdrawn is wound or coiled around the arbor E, Fig. 3, to be fully vulcanized. The tire B on the arbor E is then placed in the heater and vulcanization completed, after which it is taken from the heater and removed from the arbor E, as shown in Fig. 4. The passages are reinforced by metal, duck, or other fibrous material D', and the single elongated passage G (shown in Fig. 7) is reinforced by metal, duck, or other fibrous material G'. Cotton-duck F or other suitable fibrous reinforcing material is vulcanized to the base of the tire and being semi-elastic will allow the base of the tire to elongate. The distance between the points H $h$, Fig. 5, is practically twelve inches on a circle about eight inches in diameter measured on the periphery of the tire in the molded form as it is taken from the arbor completely vulcanized. The tire when opened out to conform to the periphery of an ordinary wheel—say, forty-two inches in diameter—will show the distance between the points H $h$, Fig. 6, to be from ten to eleven inches, according to the amount of the elongation of the cotton-duck or other fibrous reinforcing material vulcanized to the base of the tire, showing that the tire vulcanized in a small circle with cotton-duck on the base when opened to a larger circle will allow a slight elongation of the base and produce a larger compression of the rubber on the periphery of the tire. When the tire is opened out, so as to conform to a larger circle (as a wheel) than that in which it was vulcanized, the base is stretched and puts the tire under tension when placed on the wheel having a tendency to contract on the wheel, consequently putting the tire under tension on the wheel and preventing the tire from creeping.

From the above it is clear that the circumference of the tire when removed from the arbor E is less than the circumference of the tire when applied to the felly of the wheel.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. The herein-described process which consists, first, in semivulcanizing the tire in a mold to give it its cross-section shape, second, in coiling said tire with a circumference less than its circumference when applied to the wheel to expand the outer periphery, and third, in fully vulcanizing said tire in its coiled position so that when applied to the wheel the outer periphery will compress.

2. The herein-described process, which consists, first, in semivulcanizing the tire in a straight mold to give it its cross-section shape, second, in coiling said tire with a circumference less than its circumference when applied to the wheel to expand the outer periphery, and third, in fully vulcanizing said tire in its coiled position so that when applied to the wheel the outer periphery will compress.

3. The herein-described process which consists, first, in semivulcanizing the tire in a mold to give it its cross-section shape with one or more continuous passages, second, in coiling said tire with a circumference less than its circumference when applied to the wheel to expand the outer periphery, and third, in fully vulcanizing said tire in its coiled position so that when applied to the wheel the outer periphery will compress.

4. The herein-described process which consists, first, in semivulcanizing the tire in a mold to give it its cross-section shape with one or more continuous passages and with a reinforced base, second, in coiling said tire with a circumference less than its circumference when applied to the wheel to expand the outer periphery, and third, in fully vulcanizing said tire in its coiled position so that when applied to the wheel the outer periphery will compress.

5. As an article of manufacture, an elastic tire provided with one or more continuous longitudinal passages and having a normal circumference less than its circumference when applied to the wheel and having an outer periphery longer than its inner periphery and provided with reinforcing material vulcanized in said passages and with yielding reinforcing material vulcanized to its base.

In testimony whereof I have signed my name to this specification, in the presence of two subscribing witnesses, this 10th day of February, A. D. 1900.

FRANK E. HALL.

Witnesses:
 A. L. MESSER,
 E. L. HARLOW.